W SLATTER.
Ambulance.
No. 47,992.    Patented May 30, 1865.
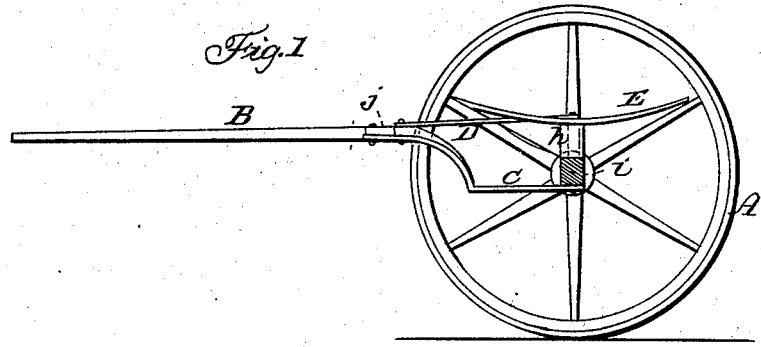
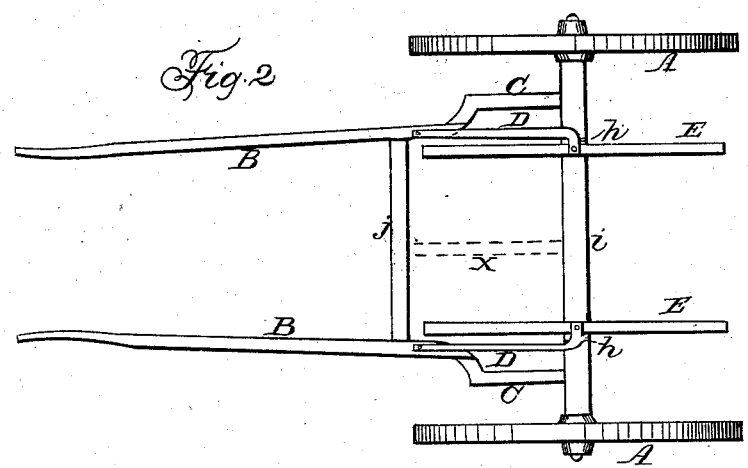
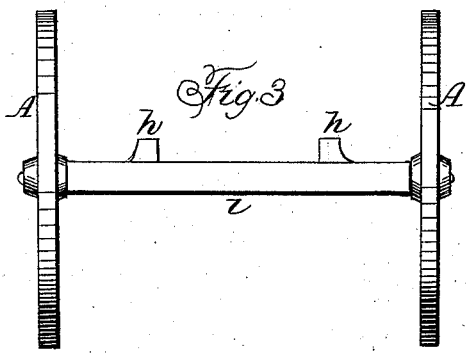
Witnesses;
James J Johnston
Alexander Hays
Inventor
W Slatter

UNITED STATES PATENT OFFICE.

WILLIAM SLATTER, OF ALLEGHENY CITY, PENNSYLVANIA.

IMPROVEMENT IN AMBULANCES.

Specification forming part of Letters Patent No. 47,992, dated May 30, 1865.

*To all whom it may concern:*

Be it known that I, WILLIAM SLATTER, of the city and county of Allegheny, in the State of Pennsylvania, have invented a new and useful Improvement in Ambulances or Carriages; and I do hereby declare that the following is a full and exact description thereof, reference being had to the accompanying drawings, and to the letters of reference marked thereon.

The nature of my invention consists in making a two-wheeled ambulance or carriage which will overcome the jolting motion of the horse by attaching the thills to the under side of axle, and bracing said thills and axle by running braces from the center of the springs to the thills, the whole being constructed, arranged, and operating substantially as hereinafter described.

To enable others skilled in the art to make and use my invention, I will proceed to de-describe its construction and operation.

In the accompanying drawings, Figure 1 represents a sectional view of the running-gear of my improved ambulance or carriage. Fig. 2 is a top view of the same. Fig. 3 is an end view representing the wheels and axle, with the blocks on which the springs rest.

A represents the wheels.

B represents the thills.

C represents the parts of the thills which are attached to the axle $i$.

D represents the braces, which are attached to the center of the springs and to the thills.

E represents the springs, which are secured to the blocks $h$, which are secured to the axle $i$.

$j$ represents the cross-bar of the thills, which may be braced to the axle $i$, as indicated by the dotted lines $x$.

The manner of attaching the various parts together and making the same I leave to those skilled in the art.

I make the body of my improved ambulance in any of the known forms, and arrange it on the springs so that the weight of the body and its load will be central to the axle $i$.

The operation of my improvement is as follows: By attaching the thills to the under side of the axle and bracing them from the center of the springs, as described, the jolting action of the horse will cause the axle to turn in hubs of the wheels, and the springs will dip and rise in harmony with the motion of the horse, thereby avoiding the jolting of the ambulance or carriage.

Having thus described the nature, construction, and operation of my improvement, what I claim as of my invention is—

Attaching the thills to the under side of the axle, and bracing the thills and axle together by braces running from the center of the springs to the thills, constructed, arranged, and operating substantially as herein described, and for the purpose set forth.

WILLIAM SLATTER.

Witnesses:
 JAMES J. JOHNSTON,
 ALEXANDER HAYS.